US012592915B2

(12) United States Patent
Ossipov et al.

(10) Patent No.: US 12,592,915 B2
(45) Date of Patent: Mar. 31, 2026

(54) INFERENCE-BASED SELECTIVE FLOW INSPECTION

(71) Applicant: Cisco Technology, Inc., San Jose, CA (US)

(72) Inventors: Andrew E Ossipov, Lewisville, TX (US); James W. Kasper, Leander, TX (US)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 18/526,253

(22) Filed: Dec. 1, 2023

(65) Prior Publication Data

US 2024/0406147 A1 Dec. 5, 2024

Related U.S. Application Data

(60) Provisional application No. 63/470,534, filed on Jun. 2, 2023.

(51) Int. Cl.
*H04L 9/40* (2022.01)
(52) U.S. Cl.
CPC ...... *H04L 63/0428* (2013.01); *H04L 63/1425* (2013.01)
(58) Field of Classification Search
CPC ... G06F 21/62; G06F 21/606; H04L 63/0428; H04L 63/1425
See application file for complete search history.

(56) References Cited

U.S. PATENT DOCUMENTS

| 10,580,225 | B2 * | 3/2020 | Deshmukh | G07C 5/006 |
| 10,594,721 | B1 * | 3/2020 | Scotney | H04L 63/1408 |
| 11,196,546 | B2 * | 12/2021 | Anderson | H04W 72/27 |
| 2016/0088001 | A1 | 3/2016 | Yeh et al. | |
| 2017/0353433 | A1 * | 12/2017 | Antony | H04L 49/70 |

(Continued)

OTHER PUBLICATIONS

Muhammad et al., "Driving Toward Safety: A Personalized Approach to Traffic Risk Assessment Leveraging Driver Behaviour Data," 2024 IEEE Smart World Congress (SWC) Year: 2024 | Conference Paper | Publisher: IEEE.*

(Continued)

*Primary Examiner* — Roderick Tolentino
(74) *Attorney, Agent, or Firm* — Lee & Hayes, P.C.

(57) ABSTRACT

Techniques for augmenting deep packet inspection capabilities of a network security device provisioned in a networked computing environment with inference-based flow selection to focus processing resources on network traffic that is likely to be malicious. The network device(s) may receive decryption policies comprising one or more decrypt and/or do not decrypt rules for applying the decryption policy to the network traffic. The network device may receive network traffic associated with a given connection flow through the network between a client device and a workload application, and the network device may determine whether to decrypt or refrain from decrypting the network traffic associated with the network flow based on a risk score that is generated by the network device using connection fingerprints associated with the client device and the workload application, respectively, based on behavioral characteristics of the client device and the workload, respectively.

20 Claims, 8 Drawing Sheets

(56) References Cited

U.S. PATENT DOCUMENTS

| | | | |
|---|---|---|---|
| 2018/0139141 A1 | 5/2018 | Stepanek et al. | |
| 2019/0297096 A1 | 9/2019 | Ahmed et al. | |
| 2019/0312846 A1 | 10/2019 | Taylor et al. | |
| 2020/0053103 A1 | 2/2020 | Rehak et al. | |
| 2020/0067930 A1* | 2/2020 | Goeringer | H04L 63/0236 |
| 2020/0106740 A1 | 4/2020 | Bangalore Krishnamurthy | |
| 2020/0302074 A1* | 9/2020 | Little | G06F 21/6218 |
| 2021/0194891 A1* | 6/2021 | Burke | H04L 63/1416 |
| 2021/0273948 A1* | 9/2021 | Miller | H04L 63/102 |
| 2021/0273957 A1 | 9/2021 | Boyer et al. | |
| 2022/0350913 A1 | 11/2022 | Shenefiel et al. | |
| 2023/0156034 A1* | 5/2023 | Naidoo | H04L 63/1425 |
| | | | 726/23 |
| 2024/0223434 A1* | 7/2024 | Cheng | H04L 41/16 |

OTHER PUBLICATIONS

Trirat et al., "MG-TAR: Multi-View Graph Convolutional Networks for Traffic Accident Risk Prediction," IEEE Transactions on Intelligent Transportation Systems Year: 2023 | vol. 24, Issue: 4 | Journal Article | Publisher: IEEE.*

International Search Report and Written Opinion for International Application No. PCT/US2024/031307, mailed Oct. 1, 2024, 12 Pages.

* cited by examiner

400

RECEIVE, AT A FIRST NETWORK DEVICE ASSOCIATED WITH A NETWORK, A DECRYPTION POLICY COMPRISING ONE OR MORE TRAFFIC RULES FOR APPLYING THE DECRYPTION POLICY TO NETWORK TRAFFIC ASSOCIATED WITH CONNECTION FLOWS THROUGH THE NETWORK
402

RECEIVE NETWORK TRAFFIC ASSOCIATED WITH A FIRST CONNECTION FLOW BETWEEN A FIRST CLIENT DEVICE AND A FIRST APPLICATION EXECUTING ON A SECOND NETWORK DEVICE OF THE NETWORK
404

GENERATE A CONNECTION PATTERN ASSOCIATED WITH THE FIRST CONNECTION FLOW BASED AT LEAST IN PART ON FIRST BEHAVIORAL CHARACTERISTICS OF THE FIRST CLIENT DEVICE AND SECOND BEHAVIORAL CHARACTERISTICS OF THE FIRST APPLICATION
406

GENERATE A FIRST RISK SCORE ASSOCIATED WITH THE FIRST CONNECTION FLOW BASED AT LEAST IN PART ON THE CONNECTION PATTERN ASSOCIATED WITH THE FIRST CONNECTION FLOW
408

DOES RISK SCORE TRIGGER DECRYPTION POLICY?
410

YES

NO

DECRYPT AT LEAST A PORTION OF THE NETWORK TRAFFIC
412

REFRAIN FROM DECRYPTING THE NETWORK TRAFFIC
414

FIG. 4

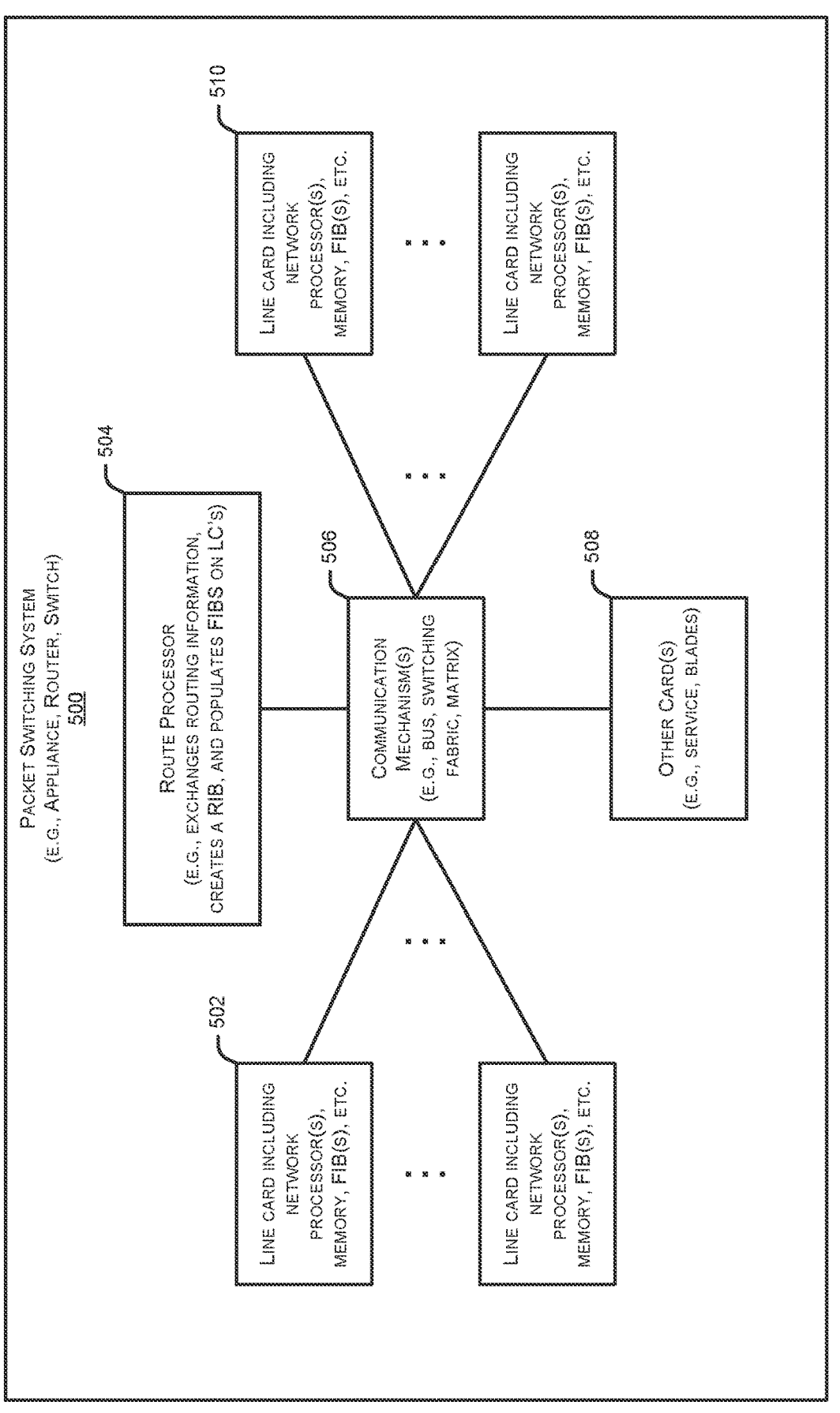

PACKET SWITCHING SYSTEM
(E.G., APPLIANCE, ROUTER, SWITCH)
500

510
LINE CARD INCLUDING NETWORK PROCESSOR(S), MEMORY, FIB(S), ETC.

LINE CARD INCLUDING NETWORK PROCESSOR(S), MEMORY, FIB(S), ETC.

504
ROUTE PROCESSOR
(E.G., EXCHANGES ROUTING INFORMATION, CREATES A RIB, AND POPULATES FIBS ON LC'S)

506
COMMUNICATION MECHANISM(S)
(E.G., BUS, SWITCHING FABRIC, MATRIX)

508
OTHER CARD(S)
(E.G., SERVICE, BLADES)

502
LINE CARD INCLUDING NETWORK PROCESSOR(S), MEMORY, FIB(S), ETC.

LINE CARD INCLUDING NETWORK PROCESSOR(S), MEMORY, FIB(S), ETC.

FIG. 5

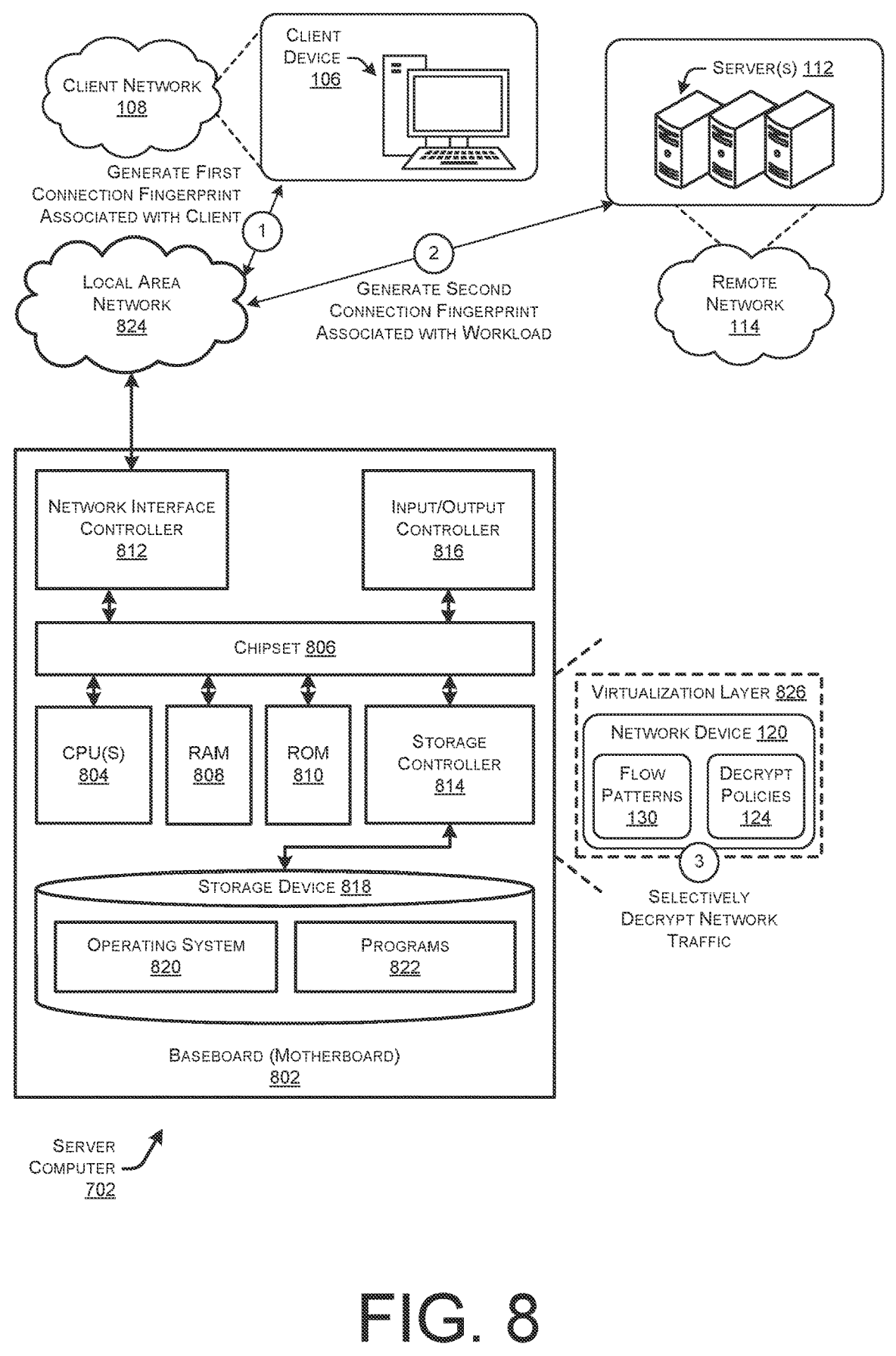

CLIENT NETWORK
108

CLIENT
DEVICE
106

SERVER(S) 112

GENERATE FIRST
CONNECTION FINGERPRINT
ASSOCIATED WITH CLIENT

①

LOCAL AREA
NETWORK
824

②

GENERATE SECOND
CONNECTION FINGERPRINT
ASSOCIATED WITH WORKLOAD

REMOTE
NETWORK
114

NETWORK INTERFACE
CONTROLLER
812

INPUT/OUTPUT
CONTROLLER
816

CHIPSET 806

CPU(S)
804

RAM
808

ROM
810

STORAGE
CONTROLLER
814

VIRTUALIZATION LAYER 826

NETWORK DEVICE 120

FLOW
PATTERNS
130

DECRYPT
POLICIES
124

③

SELECTIVELY
DECRYPT NETWORK
TRAFFIC

STORAGE DEVICE 818

OPERATING SYSTEM
820

PROGRAMS
822

BASEBOARD (MOTHERBOARD)
802

SERVER
COMPUTER
702

FIG. 8

INFERENCE-BASED SELECTIVE FLOW INSPECTION

CROSS REFERENCE TO RELATED APPLICATIONS

This application claims priority to U.S. Provisional Patent Application No. 63/470,534, filed Jun. 2, 2023, the entire contents of which are incorporated herein by reference.

TECHNICAL FIELD

The present disclosure relates generally to augmenting deep packet inspection capabilities of a network security device with inference-based flow selection to focus processing resources on traffic that is likely to be malicious.

BACKGROUND

Networks (e.g., cloud-based networks, privately deployed networks, etc.) offer services (e.g., cloud-based services, private service access, etc.) to fulfill users' computing-service needs without the users having to invest in and maintain computing infrastructure required to implement the services. For example, service providers may operate networks of data centers housing significant numbers of interconnected computing systems, such as public data centers, that are configured by the service provider to provide services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application, a managed network, and/or another type of functionality to an enterprise of users.

Network security operations users may apply security policy changes to such a managed network, such as, for example, policies requiring network devices in the managed network to decrypt network traffic transported via connection flows. These can lead to performance issues when network devices are configured to decrypt all network traffic that it routes. On the other hand, since most flows being encrypted by transport layer security (TLS), traditional network security devices (e.g., next-generation firewalls, web application firewalls (WAF), intrusion prevention system(s) (IPS), and the like) lose most of their efficacy if decryption is disabled. That is, customers may not enable decryption for the fear of substantial performance penalties when performing full decryption, or negatively impacting user experience by breaking undecryptable applications. While some customers may attempt to narrow their decryption policies to only the most important flows in the network, it is impossible to statically predict which specific categories of encrypted traffic may carry threats.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of another example method for a first network device of a networked computing environment to perform inference-based flow selection to decrypt network traffic that is determined likely to be malicious.

FIG. 5 illustrates a block diagram illustrating an example packet switching system that can be utilized to implement various aspects of the technologies disclosed herein.

FIG. 8 is a computer architecture diagram showing an illustrative computer hardware architecture for implementing a server device that can be utilized to implement aspects of the various technologies presented herein.

DESCRIPTION OF EXAMPLE EMBODIMENTS

Overview

Figure 1:
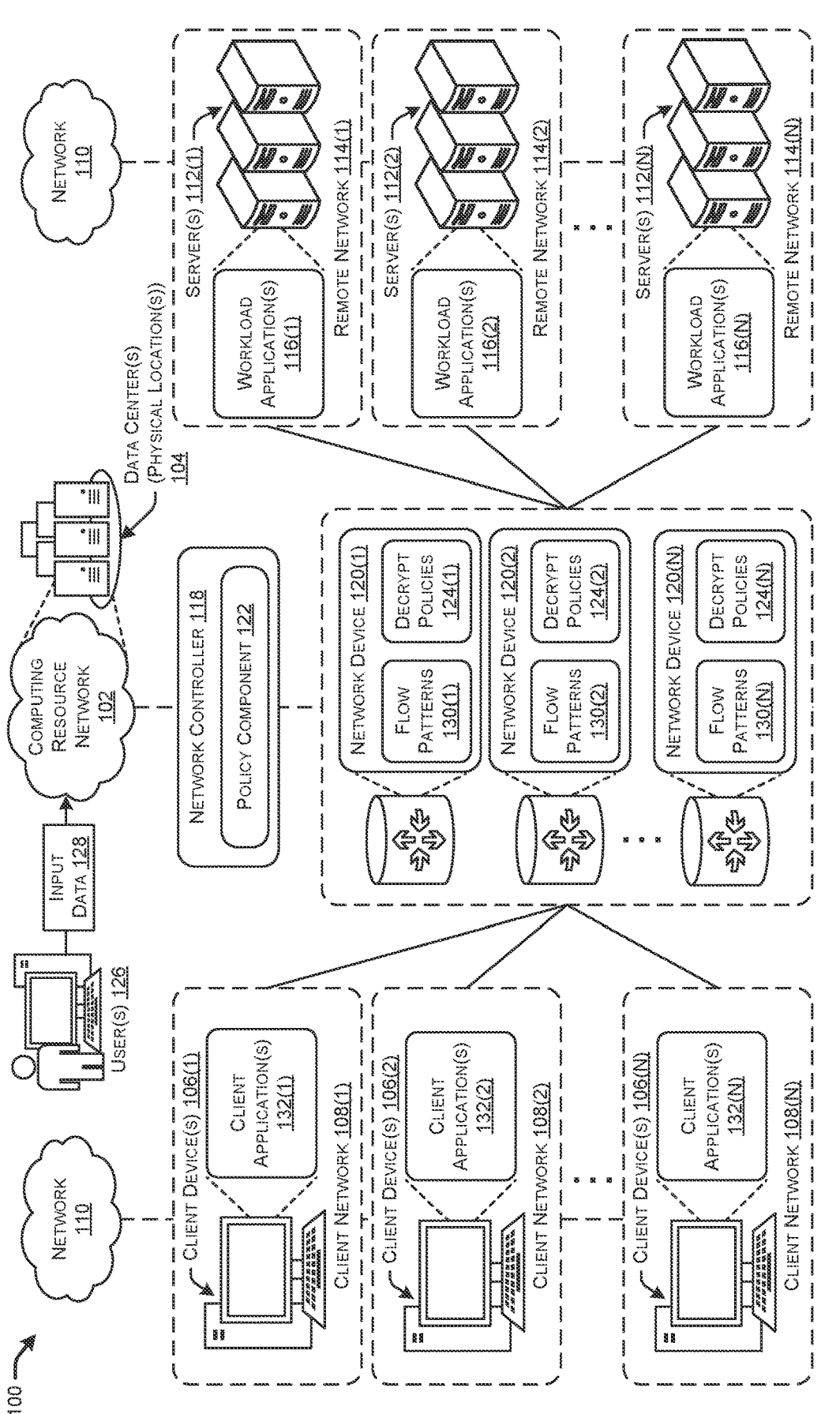
FIG. 1 illustrates a system-architecture diagram of an example environment for a networked computing environment to perform inference-based flow selection to decrypt network traffic that is determined likely to be malicious.

This disclosure describes method(s) for augmenting deep packet inspection capabilities of a network security device with inference-based flow selection to focus processing resources on traffic that is likely to be malicious. The method includes receiving, at a first network device associated with a network, a decryption policy comprising one or more traffic rules for decrypting network traffic associated with connection flows through the network. Additionally, or alternatively, the method includes receiving network traffic associated with a first connection flow between a first client device and a first application executing on a second network device of the network. Additionally, or alternatively, the method includes generating a first connection fingerprint associated with the first connection flow based at least in part on first behavioral characteristics of the first client device. Additionally, or alternatively, the method includes generating a second connection fingerprint associated with the first connection flow based at least in part second behavioral characteristics of the first application. Additionally, or alternatively, the method includes generating a first risk score associated with the first connection flow based at least in part on the first connection fingerprint and the second connection fingerprint. Additionally, or alternatively, the method includes based at least in part on the first risk score and the decryption policy, one of decrypting at least a portion of the network traffic associated with the first connection flow or refraining from decrypting the network traffic associated with the first connection flow.

Additionally, or alternatively, the method includes receiving, at a first network device associated with a network, a decryption policy comprising one or more traffic rules for applying the decryption policy to network traffic associated with connection flows through the network. Additionally, or alternatively, the method includes receiving network traffic associated with a first connection flow between a first client device and a first application executing on a second network device of the network. Additionally, or alternatively, the method includes generating a connection pattern associated with the first connection flow based at least in part on first behavioral characteristics of the first client device and second behavioral characteristics of the first application. Additionally, or alternatively, the method includes generating a first risk score associated with the first connection flow based at least in part on the connection pattern associated with the first connection flow. Additionally, or alternatively, the method includes decrypting at least a portion of the network traffic based at least in part on the first risk score and the decryption policy.

Additionally, or alternatively, the method includes receiving, at a first network device associated with a network, a decryption policy comprising one or more traffic rules for applying the decryption policy to connection flows through the network. Additionally, or alternatively, the method includes receiving network traffic associated with a first connection flow between a first client device and a first application executing on a second network device of the network. Additionally, or alternatively, the method includes generating a connection pattern associated with the first connection flow based at least in part on first behavioral characteristics of first client device and second behavioral characteristics of the first application. Additionally, or alternatively, the method includes generating a first risk score associated with the first connection flow based at least in part on the connection pattern associated with the first connection flow. Additionally, or alternatively, the method includes refraining from decrypting the network traffic associated with the first connection flow based at least in part on the first risk score and the decryption policy.

Additionally, the techniques described herein may be performed by a system and/or device having non-transitory computer-readable media storing computer-executable instructions that, when executed by one or more processors, performs the method described above.

Example Embodiments

As previously described, network devices may be driven by policies configuring the network devices to decrypt all network traffic which it routes. However, customers may not enable decryption for the fear of substantial performance penalties when performing full decryption, or negatively impacting user experience by breaking undecryptable applications. While some customers may attempt to narrow their decryption policies to only the most important flows in the network, it is impossible to statically predict which specific categories of encrypted traffic may carry threats. This disclosure describes techniques for augmenting deep packet inspection capabilities of a network security device with inference-based flow selection to focus processing resources on traffic that is likely to be malicious. In some examples, network device(s) (e.g., network security devices, next-generation firewalls, WAFs, IPS, etc.) of a network (e.g., a computing resource network, a cloud-computing network, a managed computing network, etc.) may be configured to receive network traffic associated with a given connection flow through the network between a client device and a workload application executing on another network device of the network (or a remote network accessible via the network), and determine whether to decrypt at least a portion of the network traffic associated with the connection flow or refrain from decrypting the network traffic associated with the network flow based on a risk score that is generated by the network device(s) using connection fingerprints associated with the client device and the workload application (and/or the network device hosting the workload application), respectively, based on behavioral characteristics of the client device and the workload application (and/or the network device hosting the workload application), respectively.

For example, a first network device associated with a network may receive a decryption policy comprising one or more traffic rules for decrypting network traffic associated with connection flows through the network. In some examples, the first network device may be configured as a network security device, such as, for example, a next-generation firewall, a WAF, an IDS, and/or any other device configured to execute a network security service. Additionally, or alternatively, the decryption policy may be configured via a network administrator associated with the network and may be sent to the first network device via a network controller associated with the network. For example, a policy administrator may construct a TLS decryption policy with one or more do not decrypt rules which match traffic to and from certain trusted applications that normally transfer large amounts of data (e.g., backups for database synchronization) and/or one or more decrypt rules for untrusted user and application traffic. In some examples, the rules may have one or more conditional threshold(s) applied to them, as described in more detail below.

The network device may receive network traffic associated with a first connection flow between a first client device and a first application executing on a second network device. In some examples, the second network device may be provisioned in the network or in a remote network that is accessible by the network. The network device may then determine one or more connection fingerprint(s) (also referred to herein as connection pattern(s)) for the respective endpoints (e.g., the first client device and the first application and/or the second network device) based on behavioral characteristics of connection flow(s) associated with the endpoint(s), such as, for example, one or more data fields of a connection flow that are associated with the endpoints, historical data associated with the endpoints indicating previous connection flows associated with the endpoints, an average inter-arrival time of the network traffic associated with the previous connection flows associated with the endpoints, and/or any other metric/characteristic associated with a network connection flow. In some examples, the network device may be configured to generate the connection fingerprints. Additionally, or alternatively, the network controller may be configured to generate the connection fingerprints and distribute the connection fingerprints to the network device(s) in the network. For example, the network device may generate a first connection fingerprint associated with the first connection flow based on first behavioral characteristics of the first client device and/or a second connection fingerprint associated with the first connection flow based on second behavioral characteristics of the first application and/or the second network device hosting the first application. Additionally, or alternatively, the network device may generate a connection pattern associated with the first connection flow based on the first behavioral characteristics of the first client device and the second behavioral characteristics associated with the first application and/or the second network device hosting the first application. In some examples, these connection fingerprints may be leveraged by the network device to generate a risk score associated with the first connection flow.

The network device may generate a first risk score associated with the first connection flow based on the first connection fingerprint and/or the second connection fingerprint. The risk score may indicate a likelihood that the first connection flow is malicious. Additionally, or alternatively, the risk score may indicate one or more likelihood(s) that the client device, the first application, a second application executing on the client device in association with the first connection flow, and/or the network device hosting the first application is malicious. In some examples, the risk score may be generated by comparing the connection fingerprints to known malware components. As a result of this comparison, a risk score ranging from 0-100 is generated, indicating how likely it is that a given connection flow is mapping to a known piece of malware. The network device may feed the risk score through the decryption policy to determine whether or not to decrypt the network traffic.

As previously mentioned, the decryption policy may comprise one or more do not decrypt rules and/or one or more decrypt rules. In some examples, the policy administrator may apply a conditional threshold to one or more of the decrypt rules and/or to one or more of the do not decrypt rules. For example, the administrator may assign a threshold of 90 to a do not decrypt rule matching traffic to the first application. If an actual transit connection toward the first application (e.g., the first connection flow) has a risk score above 90, the network device (e.g., a firewall) dynamically overrides the do not decrypt rule and applies full decryption and inspection to the network traffic. Additionally, or alternatively, the administrator may assign another threshold of 10 to bypass decryption of network traffic if a network flow has a risk score that is determined by the network device to be benign (e.g., not malicious). For example, if a connection flow is determined to have a risk score of 10 or lower, the network device may be configured to bypass decryption, whereas any connection flow determined to have a risk score above 10 will be decrypted as defined by the policy.

In some examples, the decryption policy may comprise a listing (or other indication) of trusted applications and untrusted applications. Additionally, or alternatively, the decryption policy may comprise a listing (or other indication) of trusted client devices and untrusted client devices. The decryption policy may be configured such that untrusted applications are always decrypted by network devices and trusted applications are sometimes decrypted by network devices. For example, if an application is trusted in the network, but the risk score associated with the connection flow is above a threshold (e.g., a score of 90 or higher), or otherwise sufficiently high (e.g., a score from 90-100), the network device may be configured to dynamically decrypt network traffic associated with this connection flow, such as, for example, full DPI and/or the like in an attempt to otherwise find threats. Additionally, or alternatively, if an application is trusted in the network and the risk score associated with the connection flow is below a threshold (e.g., a score of 10 or lower), or otherwise sufficiently low (e.g., a score from 0-10), the network device may refrain from decrypting the network traffic associated with the connection flow. In some examples, the decryption policy may be configured such that a network device is to refrain from decrypting network traffic associated with a connection flow to an untrusted application if the risk score is sufficiently low (e.g., a score from 0-10). In some examples, external criteria, such as, for example, asset risk scores, may be incorporated into the decrypt and/or do not decrypt policy decisions along with the dynamically computed risk scores. Additionally, or alternatively, the decryption policies may be dynamic in that they are changed over time by the network device, the network controller, and/or the network administrator based on caching data associated with previous connection flows. In some examples, a security hit on a given application, server, and/or client may trigger a change. For example, the previous connection flows may indicate that a given application has a good standing reputation (e.g., this application is not malicious). In some examples, the given application may be configured as a trusted application in the decryption policy. In response to receiving a security alert associated with the given application, the policy may be updated to lower the reputation of the application. In some examples, reduction of the reputation of the application may result in a change of the classification of the application from a trusted application in the network to an untrusted application in the network.

In examples where the risk score satisfies any combination of one of the decrypt rules of the network policy (or examples where the risk score indicates that the network device may override the do not decrypt rules), the network device may decrypt at least a portion of the network traffic as described herein. Additionally, or alternatively, in examples where the risk score satisfies any combination of the do not decrypt rules of the network policy (or examples where the risk score indicates that the network device may override the decrypt rules), the network device may refrain from decrypting the network traffic.

As described herein, a computing-based, cloud-based solution, network device, can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to selectively decrypting network traffic of a connection flow in the network. For instance, the techniques described herein include collecting behavioral characteristics associated with both a client device and a workload application associated with a connection flow. By using knowledge about both endpoints of a particular connection flow, network devices can make accurate policy decisions with respect to decrypting network traffic. For example, without considering both the client device and the workload application in combination, a malicious client device could be connecting to a benign server, or a benign client device could be connecting to a malicious server. In other words, a network device may decide to not decrypt the network traffic when it should decrypt network traffic if only considering one endpoint of the connection flow. This reduces the computing cost of executing network devices in the network, as the network devices are driven to selectively decrypt network traffic that is associated with connection flows that have been determined to be malicious. Additionally, security of the network is increased, as the reputations (e.g., malicious, benign, trusted, untrusted, etc.) of both endpoints of a connection flow are vetted to determine whether the network device should decrypt at least a portion of the traffic.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for a networked computing environment 102 to perform the inference-based flow selection to decrypt network traffic that is determined likely to be malicious according to the techniques described herein. Generally, the networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be accessible to client devices 106(1)-(N), provisioned in client networks 108(1)-(N), over one or more networks 110, such as the Internet, where N may be any integer greater than 1. Additionally, or alternatively, the network computing environment 102 provide the client devices 106 network access to servers 112(1)-(N), that are provisioned in remote networks 114(1)-(N) and hosting workload applications 116(1)-(N), over the one or more networks 108, where N may be any integer greater than 1. The networked computing environment 102, the client networks 108, the remote networks 114, and/or the networks 110, may each respectively include one or more networks implemented by any viable communication technology, such as wired and/or wireless modalities and/or technologies. The networked computing environment 102, the client networks 108, the remote networks 114, and/or the networks 110 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networked computing environment 102 may include devices, virtual resources, or other nodes that relay packets from one network segment to another by nodes in the computer network.

As previously described, the networked computing environment 102 may provide, host, or otherwise support one or more workload applications 116 for client devices 106 to connect to and use. The client devices 106 may comprise any type of device configured to communicate using various communication protocols (e.g., VPN, SSL, TLS, DTLS, QUIC, IPsec, and/or any other protocol) over the networks 110. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked computing environment 102 may include a network controller 118 and/or one or more network devices 120(1)-(N), where N may be any integer greater than 1. The network controller 118 may comprise a policy component 122 that is configured to distribute decryption policies 124(1)-(N) to the network devices 120. In some examples, the decryption policies 124 may comprise one or more traffic rules for decrypting network traffic associated with connection flows through the network. Additionally, or alternatively, the decryption policies 124 may be configured via one or more users 126, such as, for example, a network administrator associated with the network 102.

In some examples, a number of users 126 may interact with the networked computing environment 102 to apply decryption policies 124, change network configurations, and/or the like. The users 126 may comprise one or more of individual users, groups of users, organizations, businesses, or other entities that interact with the networked computing environment 102 via respective user devices. The user devices may be any type of computing device capable of connecting to the networked computing environment 102 via a suitable data communications network 110 such as, but not limited to, a laptop or desktop computer, a tablet computing device, a server computer, a television, or a mobile telephone. Administrative users employed by the operator of the networked computing environment 102, such as administrators managing the operation of the networked computing environment 102, might also connect with, manage, and utilize resources provided by the networked computing environment 102 in a similar fashion. The users 126 may provide input data 128 via the network(s) 110 to interact with the network devices 120, such as, for example, to disseminate decryption policies 124.

The network device(s) 120 may be configured as a network security device, such as, for example, a next-generation firewall, a WAF, an IDS, and/or any other device configured to execute a network security service.

Take, for example, network device(s) 120(1)-(N) (e.g., network security devices, next-generation firewalls, WAFs, IPS, etc.) of a networked computing environment 102 (e.g., a computing resource network, a cloud-computing network, a managed computing network, etc.) configured to receive network traffic associated with a given connection flow through the network 102 between a client device 106 and a workload application 116 executing on another network device 112 of the networked computing environment 102 (or a remote network 114 accessible via the network(s) 110), and determine whether to decrypt at least a portion of the network traffic associated with the connection flow or refrain from decrypting the network traffic associated with the network flow based on a risk score that is generated by the network device(s) 120 using connection fingerprints (also referred to herein as flow patterns 130) associated with the client device 106 (and/or a client application 132 executing thereon that is associated with the connection flow) and the workload application 116 (and/or the network device 112 hosting the workload application 116), respectively, based on behavioral characteristics of the client device 106 (and/or the client application 132 executing thereon that is associated with the connection flow) and the workload application 116 (and/or the network device 112 hosting the workload application 116), respectively.

Figure 2:
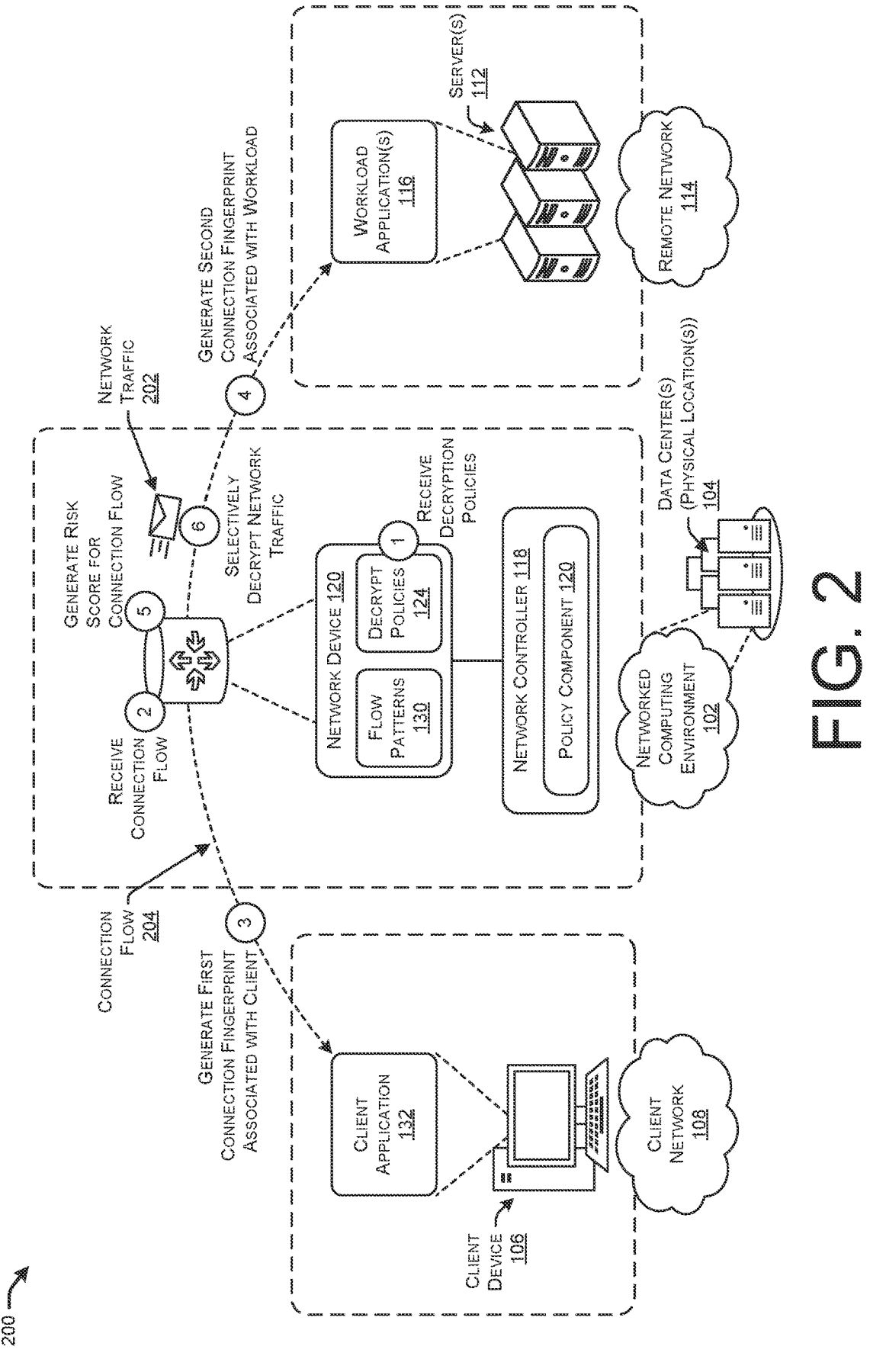
FIG. 2 illustrates a system-architecture diagram of an example flow for a networked computing environment to perform inference-based flow selection to decrypt network traffic that is determined likely to be malicious.

FIG. 2 illustrates a system-architecture diagram 200 of an example flow for a networked computing environment 102 to perform inference-based flow selection to decrypt network traffic 202 that is determined likely to be malicious. In some examples, the networked computing environment 102 as illustrated in FIG. 2 may correspond to the network computing environment 102 as described with respect to FIG. 1. In some examples, the network device 120, the client device 106, the workload application(s) 116, the servers 112, and/or the connection flow 204 as illustrated in FIG. 2, may correspond to any one of the network devices 120(1)-(N), the client device 106(1)-(N), the workload applications 116(1)-(N), the servers 112(1)-(N), and/or a corresponding connection flow between any combination thereof, as illustrated in FIG. 1. That is, the client device 106 may correspond to client device 106(1) provisioned in client network 108(1) of FIG. 1, the network device 120 may correspond to network device 120(N) of FIG. 1, and/or the workload application 116 may correspond to workload application 116(2) executing on servers 112(2) provisioned in remote network 114(2) of FIG. 1, for example. An example flow for the network device 120 having enhanced deep packet inspection capabilities configured to utilize inference-based flow selection to focus the processing resources (e.g., for DPI, firewalling, etc.) on network traffic that is likely to be malicious.

At "1," a first network device 120 associated with the networked computing environment 102 may receive a decryption policy 124 comprising one or more traffic rules for decrypting network traffic 202 associated with connection flows 204 through the network. In some examples, the first network device 120 may be configured as a network security device, such as, for example, a next-generation firewall, a WAF, an IDS, and/or any other device configured to execute a network security service. Additionally, or alternatively, the decryption policy 124 may be configured via a network administrator associated with the network 102 and may be sent to the first network device 120 via a network controller 118 associated with the network 102. For example, a policy administrator may construct a TLS decryption policy with one or more do not decrypt rules which match traffic to and from certain trusted applications that normally transfer large amounts of data (e.g., backups for database synchronization) and/or one or more decrypt rules for untrusted user and application traffic. In some examples, the rules may have one or more conditional threshold(s) applied to them, as described in more detail below.

At "2," the first network device 120 may receive network traffic 202 associated with a connection flow 204 between the client device 106 and the application 116 executing on a second network device 112. As illustrated in FIG. 2, the second network device 112 may be provisioned in a remote network 114 that is accessible by the network 102. Although not illustrated, the second network device 112 may be provisioned in the network 102.

The first network device 120 may determine one or more connection fingerprint(s) (also referred to herein as connection flow pattern(s) 130) for the respective endpoints (e.g., the client device 106 and the application 116 and/or the second network device 112) based on behavioral characteristics associated with the endpoint(s), such as, for example, one or more data fields of a connection flow 204 that are associated with the endpoints, historical data associated with the endpoints indicating previous connection flows 204 associated with the endpoints, an average inter-arrival time of the network traffic 202 associated with the previous connection flows 204 associated with the endpoints, and/or any other metric/characteristic associated with a network connection flow 204. In some examples, the first network device 120 may be configured to generate the connection fingerprints. Additionally, or alternatively, the network controller 118 may be configured to generate the connection fingerprints and distribute the connection fingerprints to the network device(s) 120 in the network 102.

At "3," the first network device 120 may generate a first connection fingerprint associated with the connection flow 204 based on first behavioral characteristics of the client device 106 and/or a client application 132 executing thereon in association with the connection flow 204.

At "4," the first network device 120 may generate a second connection fingerprint associated with the connection flow 204 based on second behavioral characteristics of the application 116 and/or the second network device 112 hosting the application 116.

In some examples, these connection fingerprints may be leveraged by the first network device 120 to generate a risk score associated with the connection flow 204.

At "5," the first network device 120 may generate a risk score associated with the connection flow 204 based on the first connection fingerprint and/or the second connection fingerprint. The risk score may indicate a likelihood that the connection flow 204 is malicious. Additionally, or alternatively, the risk score may indicate one or more likelihood(s) that any one of the client device 106, the application 116, a client application 132 executing on the client device 106 in association with the connection flow 204, and/or the second network device 112 hosting the application 116 are malicious. In some examples, the risk score may be generated by comparing the connection fingerprints to known malware components. As a result of this comparison, a risk score ranging from 0-100 is generated, indicating how likely it is that a given connection flow 204 is mapping to a known piece of malware.

At "6," the first network device 120 may feed the risk score through the decryption policy 124 to determine whether or not to decrypt the network traffic 202. As previously mentioned, a decryption policy 124 may comprise one or more do not decrypt rules and/or one or more decrypt rules. In some examples, the policy administrator may apply a conditional threshold to one or more of the decrypt rules and/or to one or more of the do not decrypt rules. For example, the administrator may assign a threshold of 90 to a do not decrypt rule matching traffic to the application 116. If an actual transit connection toward the application 116 (e.g., the connection flow 204) has a risk score above 90, the network device 120 (e.g., a firewall) dynamically overrides the do not decrypt rule and applies full decryption and inspection to the network traffic 204. Additionally, or alternatively, the administrator may assign another threshold of 10 to bypass decryption of network traffic 202 if a network flow 204 has a risk score that is determined by the network device 120 to be benign (e.g., not malicious). For example, if a connection flow 204 is determined to have a risk score of 10 or lower, the network device 120 may be configured to bypass decryption, whereas any connection flow 204 determined to have a risk score above 10 will be decrypted as defined by the policy.

In some examples, the decryption policy 124 may comprise a listing (or other indication) of trusted applications and untrusted applications. Additionally, or alternatively, the decryption policy 124 may comprise a listing (or other indication) of trusted client devices and untrusted client devices. The decryption policy 124 may be configured such that untrusted applications are always decrypted by network devices 120 and trusted applications are sometimes decrypted by network devices 120. For example, if an application 116 is trusted in the network 102, but the risk score associated with the connection flow 204 is above a threshold (e.g., a score of 90 or higher), or otherwise sufficiently high (e.g., a score from 90-100), the network device 120 may be configured to dynamically decrypt network traffic 202 associated with this connection flow 204, such as, for example, full DPI and/or the like in an attempt to otherwise find threats. Additionally, or alternatively, if the application 116 is trusted in the network 102 and the risk score associated with the connection flow 204 is below a threshold (e.g., a score of 10 or lower), or otherwise sufficiently low (e.g., a score from 0-10), the network device 120 may refrain from decrypting the network traffic 202 associated with the connection flow 204. While the above example is described with respect to applications 116, the same may be configured for client devices 106, client applications 132, and/or servers 112 hosting applications 116. In some examples, the decryption policy 124 may be configured such that a network device 120 is to refrain from decrypting network traffic 202 associated with a connection flow 204 to an untrusted application if the risk score is sufficiently low (e.g., a score from 0-10). In some examples, external criteria, such as, for example, asset risk scores, may be incorporated into the decrypt and/or do not decrypt policy decisions along with the dynamically computed risk scores. Additionally, or alternatively, the decryption policies 124 may be dynamic in that they are changed over time by the network device 120, the network controller 118, and/or the network administrator based on caching data associated with previous connection flows 204. In some examples, a security hit on a given application 116, server 112, client device 106, and/or client application 132, may trigger a change. For example, the previous connection flows 204 may indicate that a given application 116 has a good standing reputation (e.g., this application 116 is not malicious). In some examples, the given application 116 may be configured as a trusted application in the decryption policy 124. In response to receiving a security alert associated with the given application 116, the decryption policy 124 may be updated to lower the reputation of the application 116. In some examples, reduction of the reputation of the application 116 may result in a change of the classification of the application 116 from a trusted application in the network to an untrusted application in the network 102.

In examples where the risk score satisfies any combination of one of the decrypt rules of the network policy 124 (or examples where the risk score indicates that the network device 120 may override the do not decrypt rules), the network device 120 may decrypt at least a portion of the network traffic 202 as required to perform any of the security services described herein (e.g., next-generation firewalls, WAFs, IPS, DPI, and/or the like). Additionally, or alternatively, in examples where the risk score satisfies any combination of the do not decrypt rules of the network policy 124 (or examples where the risk score indicates that the network device 120 may override the decrypt rules), the network device 120 may refrain from decrypting the network traffic 202.

Figure 3:
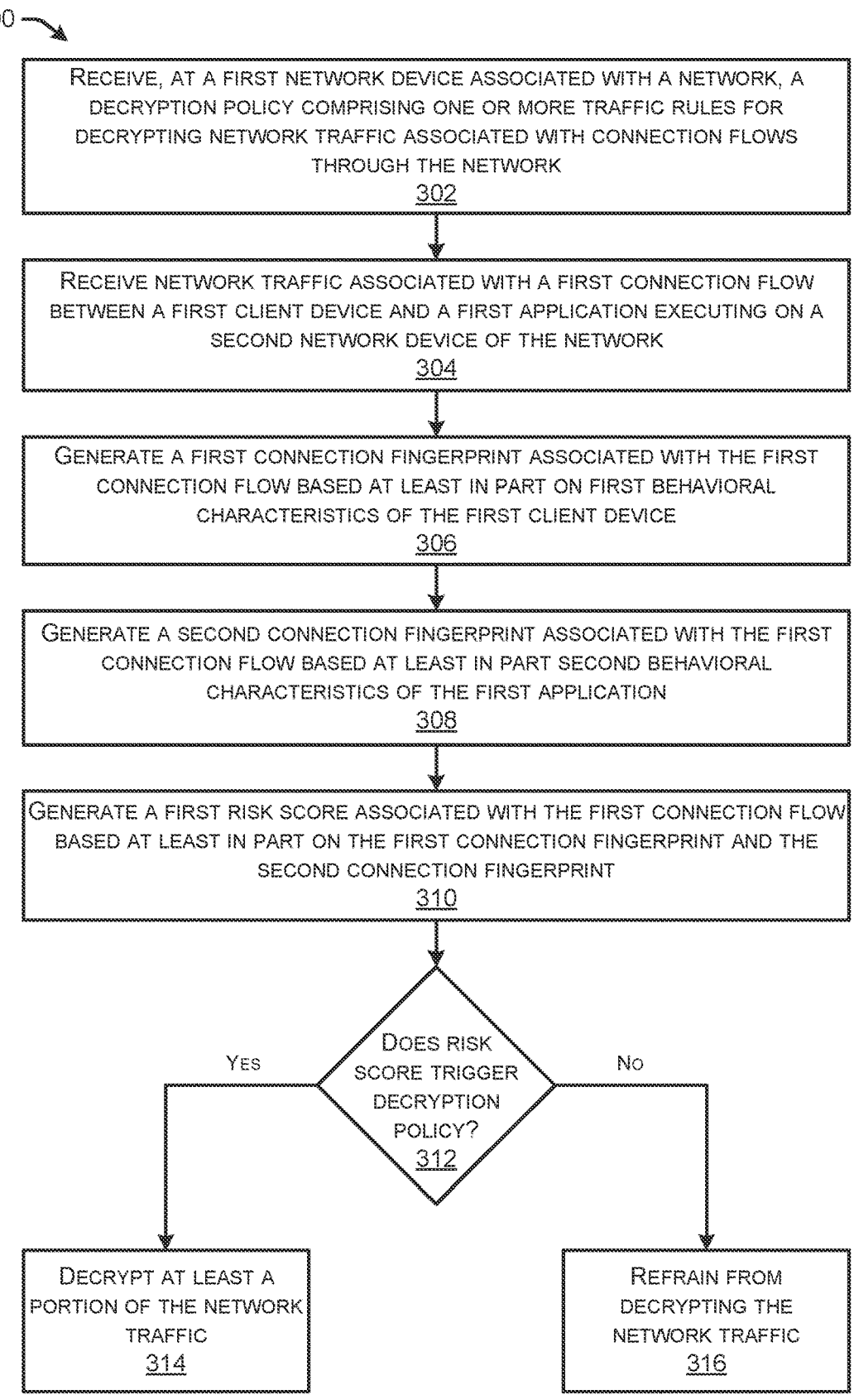
FIG. 3 illustrates a flow diagram of an example method for a first network device of a networked computing environment to perform inference-based flow selection to decrypt network traffic that is determined likely to be malicious.

FIGS. 3 and 4 illustrate flow diagrams of example methods 300 and 400 and that illustrate aspects of the functions performed at least partly by the networked computing environment(s) 102 and/or by the respective components within as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first network device of a networked computing environment to perform inference-based flow selection to decrypt network traffic that is determined likely to be malicious. In some examples, the networked computing environment and/or the first network device may correspond to the networked computing environment 102 and/or the routing device(s) 120, as described with respect to FIGS. 1 and 2.

At 302, the method 300 may include receiving, at a first network device associated with a network, a decryption policy comprising one or more traffic rules for decrypting network traffic associated with connection flows through the network. In some examples, the decryption policy may correspond to the decryption policy 124 as described with respect to FIGS. 1 and 2.

At 304, the method 300 may include receiving network traffic associated with a first connection flow between a first client device and a first application executing on a second network device of the network. In some examples, the network traffic, the first connection flow, the first client device, the first application, and/or the second network device may correspond to the network traffic 202, the connection flow 204, the client device 106, the application 116, and/or the servers 112 as described with respect to FIG. 2. Additionally, or alternatively, the connection flow may be associated with a client application executing on the first client device, such as, for example, the client application 132 as described with respect to FIGS. 1 and 2.

At 306, the method 300 may include generating a first connection fingerprint associated with the first connection flow based at least in part on first behavioral characteristics of the first client device.

At 308, the method 300 may include generating a second connection fingerprint associated with the first connection flow based at least in part second behavioral characteristics of the first application.

At 310, the method 300 may include generating a first risk score associated with the first connection flow based at least in part on the first connection fingerprint and the second connection fingerprint. In some examples, the risk score may be generated based on comparing the connection fingerprint(s) to known malware components, or any other kind of data indicating known malicious network behavior.

At 312, the method 300 may include determining whether the first risk score triggers the decryption policy and/or one or more rules included in the decryption policy. By way of example, step 312 may include determining that the first risk score does trigger the decryption policy (e.g., the first risk score satisfies one or more thresholds associated with one or more decrypt and/or do not decrypt rules included in the decryption policy). In such examples, the method 300 may continue to 314. Additionally, or alternatively, step 312 may include determining that the first risk score does not trigger the decryption policy (e.g., the first risk score does not satisfy at least one of one or more thresholds associated with one or more decrypt and/or do not decrypt rules included in the decryption policy). In such examples, the method 300 may continue to 316.

At 314, the method 300 may include decrypting at least a portion of the network traffic associated with the first connection flow. For example, the network device may be configured to decrypt at least a portion of the network traffic associated with the first connection flow prior to routing the network traffic to and/or from the first client device and/or the first application without decrypting the network traffic. In some examples, the network device may be configured to decrypt the network traffic such that the network device May perform required security operations on the network traffic (e.g., firewalling techniques, DPI, IPS, and/or the like).

At 316, the method 300 may include refraining from decrypting the network traffic associated with the first connection flow. For example, the network device may be configured to route the network traffic to and/or from the first client device and/or the first application without decrypting the network traffic.

In some examples, the first risk score may indicate at least one of a first likelihood that the first connection flow is malicious, a second likelihood that the first client device is malicious, a third likelihood that the first application is malicious, and/or a fourth likelihood that the second network device is malicious.

In some examples, the decryption policy may include at least a first traffic rule representing a first risk score threshold. Additionally, or alternatively, the method 300 may include determining that the first risk score is less than the first risk score threshold. Additionally, or alternatively, the method 300 may include refraining from decrypting the network traffic associated with the first connection flow based at least in part on determining that the first risk score is less than the first risk score threshold.

In some examples, the decryption policy may include at least a first traffic rule representing a first risk score threshold. Additionally, or alternatively, the method 300 may include determining that the first risk score is greater than the first risk score threshold. Additionally, or alternatively, the method 300 may include decrypting at least the portion of the network traffic associated with the first connection flow based at least in part on determining that the first risk score is greater than the first risk score threshold.

In some examples, the decryption policy may include at least a first traffic rule representing a first risk score threshold. Additionally, or alternatively, the method 300 may include determining that the first application is a trusted application in the network. Additionally, or alternatively, the method 300 may include determining that the first risk score is greater than the first risk score threshold. Additionally, or alternatively, the method 300 may include decrypting at least the portion of the network traffic associated with the first connection flow based at least in part on determining that the first risk score is greater than the first risk score threshold.

In some examples, the decryption policy may include at least a first traffic rule representing a first risk score threshold. Additionally, or alternatively, the method 300 may include determining that the first risk score is less than the first risk score threshold. Additionally, or alternatively, the method 300 may include determining that the first application is an untrusted application in the network. Additionally, or alternatively, the method 300 may include decrypting at least the portion of the network traffic associated with the first connection flow based at least in part on determining that the first application is an untrusted application in the network.

In some examples, the first behavioral characteristics may comprise at least one of data fields of the connection flow that are associated with the first client device, historical data associated with the client device, the historical data comprising previous connections flows associated with the client device, and/or an average inter-arrival time of the network traffic associated with the previous connection flows associated with the client device.

FIG. 4 illustrates a flow diagram of another example method 400 for a first network device of a networked computing environment to perform inference-based flow selection to decrypt network traffic that is determined likely to be malicious. In some examples, the networked computing environment and/or the first network device may correspond to the networked computing environment 102 and/or the routing device(s) 120, as described with respect to FIGS. 1 and 2.

At 402, the method 400 may include receiving, at a first network device associated with a network, a decryption policy comprising one or more traffic rules for applying the decryption policy to network traffic associated with connection flows through the network. In some examples, the decryption policy may correspond to the decryption policy 124 as described with respect to FIGS. 1 and 2.

At 404, the method 400 may include receiving network traffic associated with a first connection flow between a first client device and a first application executing on a second network device of the network. In some examples, the network traffic, the first connection flow, the first client device, the first application, and/or the second network device may correspond to the network traffic 202, the connection flow 204, the client device 106, the application 116, and/or the servers 112 as described with respect to FIG. 2. Additionally, or alternatively, the connection flow may be associated with a client application executing on the first client device, such as, for example, the client application 132 as described with respect to FIGS. 1 and 2.

At 406, the method 400 may include generating a connection pattern associated with the first connection flow based at least in part on first behavioral characteristics of the first client device and second behavioral characteristics of the first application.

At 408, the method 400 may include generating a first risk score associated with the first connection flow based at least in part on the connection pattern associated with the first connection flow.

At 410, the method 400 may include determining whether the first risk score triggers the decryption policy and/or one or more rules included in the decryption policy. By way of example, step 410 may include determining that the first risk score does trigger the decryption policy (e.g., the first risk score satisfies one or more thresholds associated with one or more decrypt and/or do not decrypt rules included in the decryption policy). In such examples, the method 400 may continue to 412. Additionally, or alternatively, step 410 may include determining that the first risk score does not trigger the decryption policy (e.g., the first risk score does not satisfy at least one of one or more thresholds associated with one or more decrypt and/or do not decrypt rules included in the decryption policy). In such examples, the method 400 may continue to 414.

At 412, the method 400 may include decrypting at least a portion of the network traffic associated with the first connection flow. For example, the network device may be configured to decrypt at least a portion of the network traffic associated with the first connection flow prior to routing the network traffic to and/or from the first client device and/or the first application without decrypting the network traffic. In some examples, the network device may be configured to decrypt the network traffic such that the network device may perform required security operations on the network traffic (e.g., firewalling techniques, DPI, IPS, and/or the like).

At 414, the method 400 may include refraining from decrypting the network traffic associated with the first connection flow. For example, the network device may be configured to route the network traffic to and/or from the first client device and/or the first application without decrypting the network traffic.

In some examples, the first risk score may indicate a likelihood that at least one of the client device, the first application, or the second network device is malicious.

In some examples, the connection pattern is a first connection pattern. Additionally, or alternatively, the method 400 may include receiving network traffic associated with a second connection flow between the first client device and a second application executing on a third network device of the network. Additionally, or alternatively, the method 400 may include generating a second connection pattern associated with the second connection flow based at least in part on the first behavioral characteristics of the first client device and third behavioral characteristics of the second application. Additionally, or alternatively, the method 400 may include generating a second risk score associated with the second connection flow based at least in part on the second connection pattern associated with the second connection flow. Additionally, or alternatively, the method 400 may include receiving the network traffic associated with the second connection flow. Additionally, or alternatively, the method 400 may include refraining from decrypting the network traffic associated with the second connection flow based at least in part on the second risk score and the decryption policy.

In some examples, the first behavioral characteristics comprise at least one of data fields of the connection flow that are associated with the first client device, historical data associated with the client device, the historical data comprising previous connections flows associated with the client device, and/or an average inter-arrival time of the network traffic associated with the previous connection flows associated with the client device.

In some examples, the first network device is a secure access gateway configured to apply security services to the network traffic. Additionally, or alternatively, the security services may comprise at least one of a firewall service (e.g., a next-generation firewall, WAF, a cloud-delivered firewall (CDF), and/or the like), a deep packet inspection service, an intrusion prevention system, and/or the like.

In some examples, the network device may be configured to route the network traffic between the first client devices and the first application via the first connection flow.

In some examples, the decryption policy may include at least a first traffic rule representing a first risk score threshold. Additionally, or alternatively, the method 400 may include determining that the first risk score is less than the first risk score threshold. In some examples, refraining from decrypting the network traffic associated with the first connection flow may be based at least in part on determining that the first risk score is less than the first risk score threshold.

FIG. 5 illustrates a block diagram illustrating an example packet switching device (or system) 500 that can be utilized to implement various aspects of the technologies disclosed herein. In some examples, packet switching device(s) 500 may be employed in various networks, such as, for example, the networked computing environment 102 as described with respect to FIGS. 1 and 2, respectively.

In some examples, a packet switching device 500 may comprise multiple line card(s) 502, 510, each with one or more network interfaces for sending and receiving packets over communications links (e.g., possibly part of a link aggregation group). The packet switching device 500 may also have a control plane with one or more processing elements 504 for managing the control plane and/or control plane processing of packets associated with forwarding of packets in a network. The packet switching device 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching device 500 may comprise hardware-based communication mechanism 506 (e.g., bus, switching fabric, and/or matrix, etc.) for allowing its different entities 502, 504, 508 and 510 to communicate. Line card(s) 502, 510 may typically perform the actions of being both an ingress and/or an egress line card 502, 510, in regard to multiple other particular packets and/or packet streams being received by, or sent from, packet switching device 500.

Figure 6:
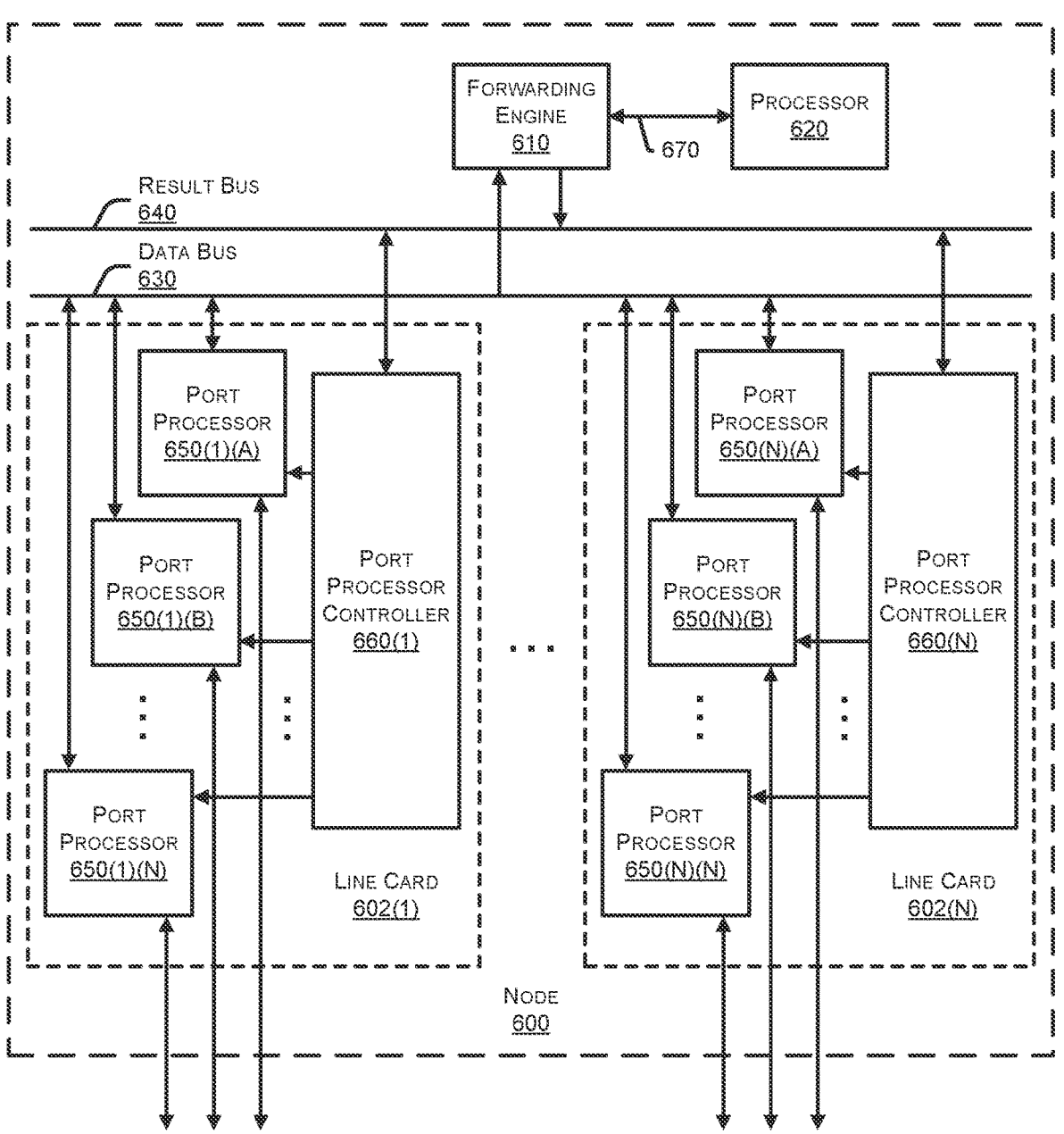
FIG. 6 illustrates a block diagram illustrating certain components of an example node that can be utilized to implement various aspects of the technologies disclosed herein.

FIG. 6 illustrates a block diagram illustrating certain components of an example node 600 that can be utilized to implement various aspects of the technologies disclosed herein. In some examples, node(s) 600 may be employed in various networks, such as, for example, the networked computing environment 102 as described with respect to FIGS. 1 and 2, respectively.

In some examples, node 600 may include any number of line cards 602 (e.g., line cards 602(1)-(N), where N may be any integer greater than 1) that are communicatively coupled to a forwarding engine 610 (also referred to as a packet forwarder) and/or a processor 620 via a data bus 630 and/or a result bus 640. Line cards 602(1)-(N) may include any number of port processors 650(1)(A)-(N)(N) which are controlled by port processor controllers 660(1)-(N), where N may be any integer greater than 1. Additionally, or alternatively, forwarding engine 610 and/or processor 620 are not only coupled to one another via the data bus 630 and the result bus 640, but may also communicatively coupled to one another by a communications link 670.

The processors (e.g., the port processor(s) 650 and/or the port processor controller(s) 660) of each line card 602 may be mounted on a single printed circuit board. When a packet or packet and header are received, the packet or packet and header may be identified and analyzed by node 600 (also referred to herein as a router) in the following manner. Upon receipt, a packet (or some or all of its control information) or packet and header may be sent from one of port processor(s) 650(1)(A)-(N)(N) at which the packet or packet and header was received and to one or more of those devices coupled to the data bus 630 (e.g., others of the port processor(s) 650(1)(A)-(N)(N), the forwarding engine 610 and/or the processor 620). Handling of the packet or packet and header may be determined, for example, by the forwarding engine 610. For example, the forwarding engine 610 may determine that the packet or packet and header should be forwarded to one or more of port processors 650(1)(A)-(N)(N). This may be accomplished by indicating to corresponding one(s) of port processor controllers 660 (1)-(N) that the copy of the packet or packet and header held in the given one(s) of port processor(s) 650(1)(A)-(N)(N) should be forwarded to the appropriate one of port processor(s) 650(1)(A)-(N)(N). Additionally, or alternatively, once a packet or packet and header has been identified for processing, the forwarding engine 610, the processor 620, and/or the like may be used to process the packet or packet and header in some manner and/or maty add packet security information in order to secure the packet. On a node 600 sourcing such a packet or packet and header, this processing may include, for example, encryption of some or all of the packet's or packet and header's information, the addition of a digital signature, and/or some other information and/or processing capable of securing the packet or packet and header. On a node 600 receiving such a processed packet or packet and header, the corresponding process may be performed to recover or validate the packet's or packet and header's information that has been secured.

Figure 7:
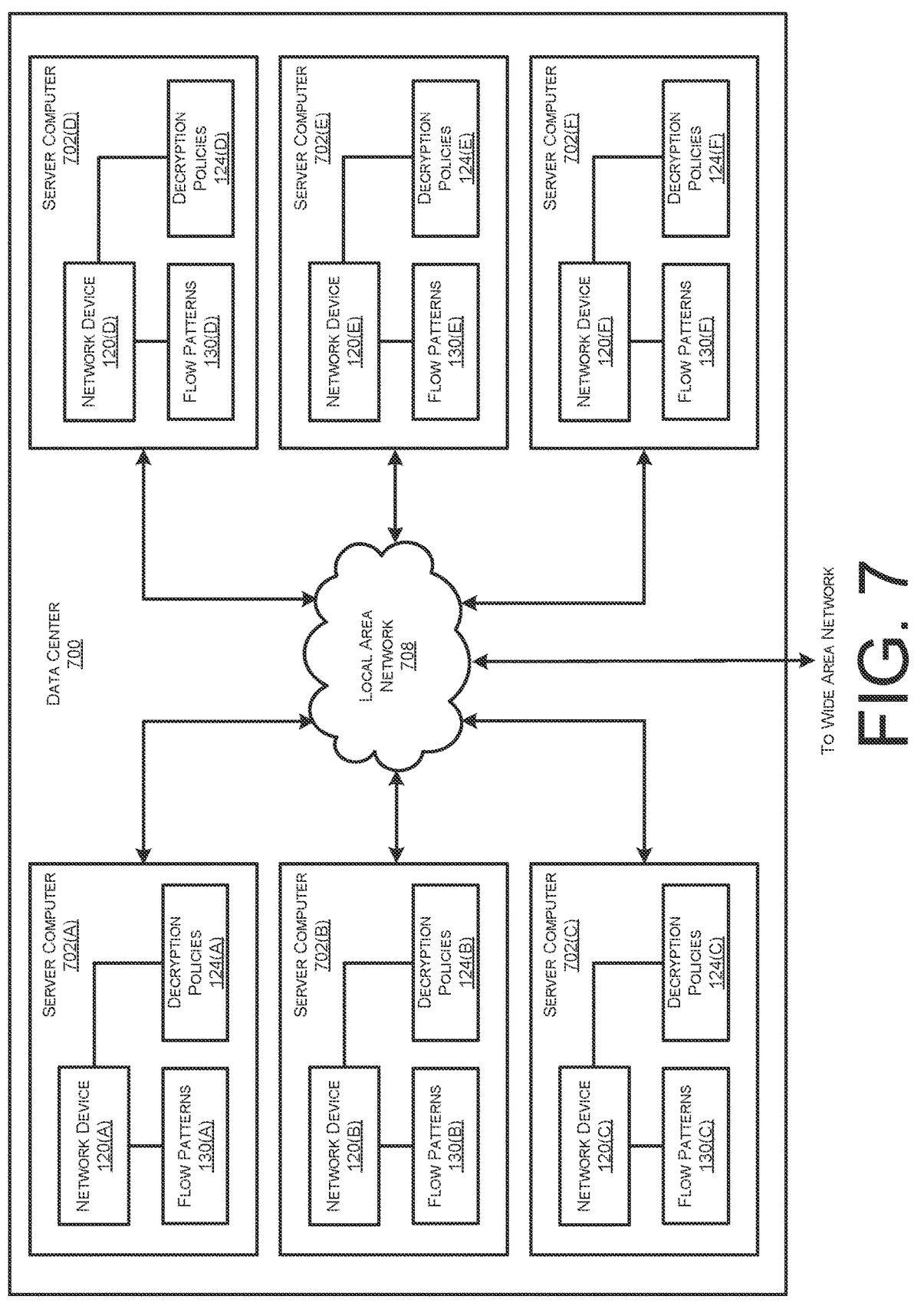
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702E (which might be referred to herein singularly as "a server computer 702" or in the plural as "the server computers 702") for providing computing resources. In some examples, the server computers 702 may include, or correspond to, the servers associated with the site (or data center) 104, the packet switching system 500, and/or the node 600 described herein with respect to FIGS. 1, 5 and 6, respectively.

The server computers 702 can be standard tower, rack-mount, or blade server computers configured appropriately for providing the computing resources described herein. As mentioned above, the computing resources provided by the networked computing environment 102 can be data processing resources such as VM instances or hardware computing systems, database clusters, computing clusters, storage clusters, data storage resources, database resources, networking resources, and others. Some of the servers 702 can also be configured to execute a resource manager capable of instantiating and/or managing the computing resources. In the case of VM instances, for example, the resource manager can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702E in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute a network device 120 and/or store one or more flow patterns 130 (also referred to herein as connection fingerprints) and/or one or more decryption policies 124.

In some instances, the networked computing environment 102 may provide computing resources, like application containers, VM instances, and storage, on a permanent or an as-needed basis. Among other types of functionality, the computing resources provided by the networked computing environment 102 may be utilized to implement the various services described above. The computing resources provided by the networked computing environment 102 can include various types of computing resources, such as data processing resources like application containers and VM instances, data storage resources, networking resources, data communication resources, network services, and the like.

Each type of computing resource provided by the networked computing environment 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The networked computing environment 102 can also be configured to provide other types of computing resources not mentioned specifically herein.

The computing resources provided by the networked computing environment 102 may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

FIG. 8 shows an example computer architecture for a computing device (or network routing device) 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computing device 702 may, in some examples, correspond to a physical server of a data center 104, the packet switching system 500, and/or the node 600 described herein with respect to FIGS. 1, 7, and 8, respectively.

The computing device 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 702. The chipset 806 can further provide an interface to a computer-readable storage medium such as a read-only memory ("ROM") 12810 or non-volatile RAM ("NVRAM") for storing basic routines that help to startup the computing device 702 and to transfer information between the various components and devices. The ROM 12810 or NVRAM can also store other software components necessary for the operation of the computing device 702 in accordance with the configurations described herein.

The computing device 702 can operate in a networked environment using logical connections to remote computing devices and computer systems through a network, such as the network 824 (or 708). The chipset 806 can include functionality for providing network connectivity through a NIC 812, such as a gigabit Ethernet adapter. The NIC 812 is capable of connecting the computing device 702 to other computing devices over the network 824. It should be appreciated that multiple NICs 812 can be present in the computing device 702, connecting the computer to other types of networks and remote computer systems.

The computing device 702 can be connected to a storage device 818 that provides non-volatile storage for the computing device 702. The storage device 818 can store an operating system 820, programs 822, and data, which have been described in greater detail herein. The storage device 818 can be connected to the computing device 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 702 can further read information from the storage device 818 by detecting the physical states or characteristics of one or more particular locations within the physical storage units.

In addition to the mass storage device 818 described above, the computing device 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 702. In some examples, the operations performed by the networked computing environment 102, and or any components included therein, may be supported by one or more devices similar to computing device 702. Stated otherwise, some or all of the operations performed by the networked computing environment 102, and or any components included therein, may be performed by one or more computing device 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 702.

In one embodiment, the storage device 818 or other computer-readable storage media is encoded with computer-executable instructions which, when loaded into the computing device 702, transform the computer from a general-purpose computing system into a special-purpose computer capable of implementing the embodiments described herein. These computer-executable instructions transform the computing device 702 by specifying how the CPUs 804 transition between states, as described above. According to one embodiment, the computing device 702 has access to computer-readable storage media storing computer-executable instructions which, when executed by the computing device 702, perform the various processes described above with regard to FIGS. 3 and 4. The computing device 702 can also include computer-readable storage media having instructions stored thereupon for performing any of the other computer-implemented operations described herein.

The computing device 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 702 might not include all of the components shown in FIG. 8, can include other components that are not explicitly shown in FIG. 8, or might utilize an architecture completely different than that shown in FIG. 8.

The server computer 702 may support a virtualization layer 826, such as one or more components associated with the networked computing environment 102, such as, for example, network device 120. The network device 120 may store one or more decryption policies 124 and/or one or more flow patterns 130 associated with the network. In some examples, the flow patterns 130 may comprise a historical database of previous flow patterns between client device(s) 106 of a client network 108 connecting to workload applications (hosted on servers 112) of a remote network 114. Additionally, or alternatively, the flow patterns 130 may comprise new flow patterns generated for a given connection flow through the network (e.g., one or more connection fingerprints associated with a client device and/or a workload application). The network device 120 may be configured to selectively decrypt network traffic associated with connection flows through the network, such as, for example, a connection flow between the client device 106 and the servers 112, according to the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a first network device associated with a network, a decryption policy comprising one or more traffic rules for decrypting network traffic associated with connection flows through the network;
   receiving network traffic associated with a first connection flow between a first client device and a first application executing on a second network device of the network;
   generating a first connection fingerprint associated with the first connection flow based at least in part on first behavioral characteristics of the first client device;
   generating a second connection fingerprint associated with the first connection flow based at least in part second behavioral characteristics of the first application;
   generating a first risk score associated with the first connection flow based at least in part on the first connection fingerprint and the second connection fingerprint; and
   based at least in part on the first risk score and the decryption policy, one of:
      decrypting, by the first network device, at least a portion of the network traffic associated with the first connection flow, wherein at least the portion of the network traffic is required to be decrypted to perform one or more security services with respect to the first connection flow; or
      refraining from decrypting, by the first network device, the network traffic associated with the first connection flow.

2. The method of claim 1, wherein the first risk score indicates at least one of:
   a first likelihood that the first connection flow is malicious;
   a second likelihood that the first client device is malicious;
   a third likelihood that the first application is malicious; and
   a fourth likelihood that the second network device is malicious.

3. The method of claim 1, wherein the decryption policy includes at least a first traffic rule representing a first risk score threshold, and the method further comprising:
   determining that the first risk score is less than the first risk score threshold; and
   refraining from decrypting the network traffic associated with the first connection flow based at least in part on determining that the first risk score is less than the first risk score threshold.

4. The method of claim 1, wherein the decryption policy includes at least a first traffic rule representing a first risk score threshold, and the method further comprising:

determining that the first risk score is greater than the first risk score threshold; and decrypting at least the portion of the network traffic associated with the first connection flow based at least in part on determining that the first risk score is greater than the first risk score threshold.

5. The method of claim 1, wherein the decryption policy includes at least a first traffic rule representing a first risk score threshold, and the method further comprising:

determining that the first application is a trusted application in the network;

determining that the first risk score is greater than the first risk score threshold; and decrypting at least the portion of the network traffic associated with the first connection flow based at least in part on determining that the first risk score is greater than the first risk score threshold.

6. The method of claim 1, wherein the decryption policy includes at least a first traffic rule representing a first risk score threshold, and the method further comprising:

determining that the first risk score is less than the first risk score threshold;

determining that the first application is an untrusted application in the network; and decrypting at least the portion of the network traffic associated with the first connection flow based at least in part on determining that the first application is an untrusted application in the network.

7. The method of claim 1, wherein the first behavioral characteristics comprise at least one of:

data fields of the first connection flow that are associated with the first client device;

historical data associated with the first client device, the historical data comprising previous connections flows associated with the first client device; or an average inter-arrival time of the network traffic associated with the previous connection flows associated with the first client device.

8. A system comprising:

one or more processors; and one or more computer-readable media storing computer-executable instructions that, when executed by the one or more processors, cause the one or more processors to perform operations comprising:

receiving, at a first network device associated with a network, a decryption policy comprising one or more traffic rules for applying the decryption policy to network traffic associated with connection flows through the network;

receiving network traffic associated with a first connection flow between a first client device and a first application executing on a second network device of the network;

generating a connection pattern associated with the first connection flow based at least in part on first behavioral characteristics of the first client device and second behavioral characteristics of the first application;

generating a first risk score associated with the first connection flow based at least in part on the connection pattern associated with the first connection flow; and decrypting, by the first network device, at least a portion of the network traffic based at least in part on the first risk score and the decryption policy, wherein at least the portion of the network traffic is required to be decrypted to perform one or more security services with respect to the first connection flow.

9. The system of claim 8, wherein the first risk score indicates a likelihood that at least one of the client device, the first application, or the second network device is malicious.

10. The system of claim 8, wherein the connection pattern is a first connection pattern, and the operations further comprising:

receiving network traffic associated with a second connection flow between the first client device and a second application executing on a third network device of the network;

generating a second connection pattern associated with the second connection flow based at least in part on the first behavioral characteristics of the first client device and third behavioral characteristics of the second application;

generating a second risk score associated with the second connection flow based at least in part on the second connection pattern associated with the second connection flow;

receiving the network traffic associated with the second connection flow; and refraining from decrypting the network traffic associated with the second connection flow based at least in part on the second risk score and the decryption policy.

11. The system of claim 8, wherein the first behavioral characteristics comprise at least one of:

data fields of the first connection flow that are associated with the first client device;

historical data associated with the first client device, the historical data comprising previous connections flows associated with the first client device; or an average inter-arrival time of the network traffic associated with the previous connection flows associated with the first client device.

12. The system of claim 8, wherein the first network device is a secure access gateway configured to apply security services to the network traffic, the security services comprising at least one of:

a firewall service; and a deep packet inspection (DPI) service.

13. The system of claim 8, wherein the first network device is configured to route the network traffic between the first client device and the first application via the first connection flow.

14. The system of claim 8, wherein the decryption policy includes at least a first traffic rule representing a first risk score threshold, and the operations further comprising determining that the first risk score is less than the first risk score threshold, wherein refraining from decrypting the network traffic associated with the first connection flow is based at least in part on determining that the first risk score is less than the first risk score threshold.

15. A method comprising: receiving, at a first network device associated with a network, a decryption policy comprising one or more traffic rules for applying the decryption policy to connection flows through the network;

receiving network traffic associated with a first connection flow between a first client device and a first application executing on a second network device of the network;

generating a connection pattern associated with the first connection flow based at least in part on first behavioral characteristics of first client device and second behavioral characteristics of the first application;

generating a first risk score associated with the first connection flow based at least in part on the connection pattern associated with the first connection flow;

and refraining from decrypting, by the first network device, at least a portion of the network traffic associated with the first connection flow based at least in part on the first risk score and the decryption policy, wherein at least the portion of the network traffic is decrypted to perform one or more security services with respect to the first connection flow.

16. The method of claim 15, wherein the connection pattern indicates a likelihood that at least one of the client device, the first application, or the second network device is malicious.

17. The method of claim 15, wherein the connection pattern is a first connection pattern, and the method further comprising:

receiving network traffic associated with a second connection flow between a second client device and the first application;

generating a second connection pattern associated with the second connection flow based at least in part on the second behavioral characteristics of the first application and third behavioral characteristics of the second client device;

generating a second risk score associated with the second connection flow based at least in part on the second connection pattern associated with the second connection flow; and decrypting at least a portion of the network traffic associated with the second connection flow based at least in part on the second risk score and the decryption policy.

18. The method of claim 15, wherein the second behavioral characteristics comprise at least one of:

data fields of the connection flow that are associated with at least one of the first application or the second network device;

historical data associated with at least one of the first application or the second network device, the historical data comprising previous connections flows associated with at least one of the first application or the second network device; or an average inter-arrival time of the network traffic associated with the previous connection flows associated with at least one of the first application or the second network device.

19. The method of claim 15, wherein the decryption policy includes at least a first traffic rule representing a first risk score threshold, and the method further comprising:

determining that the first risk score is greater than the first risk score threshold; and decrypting at least a portion of the network traffic associated with the first connection flow based at least in part on determining that the first risk score is greater than the first risk score threshold.

20. The method of claim 15, wherein the decryption policy includes at least a first traffic rule representing a first risk score threshold, and the method further comprising:

determining that the first application is a trusted application in the network;

determining that the first risk score is greater than the first risk score threshold; and decrypting at least a portion of the network traffic associated with the first connection flow based at least in part on determining that the first risk score is greater than the first risk score threshold.

* * * * *